I. L. MILLER.
NUT LOCK.
APPLICATION FILED APR. 17, 1909.
975,709. Patented Nov. 15, 1910.
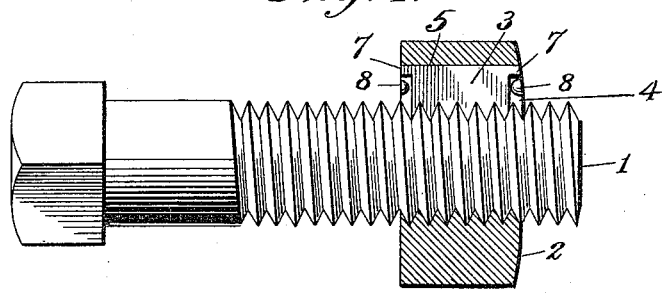
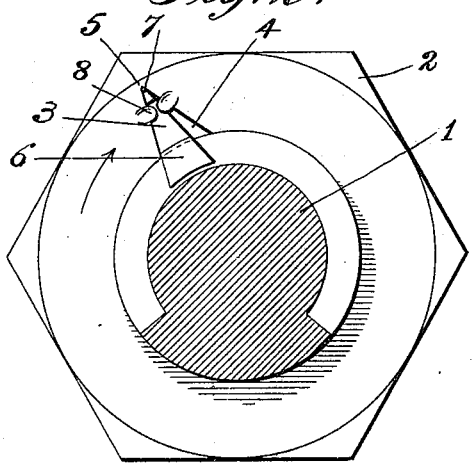 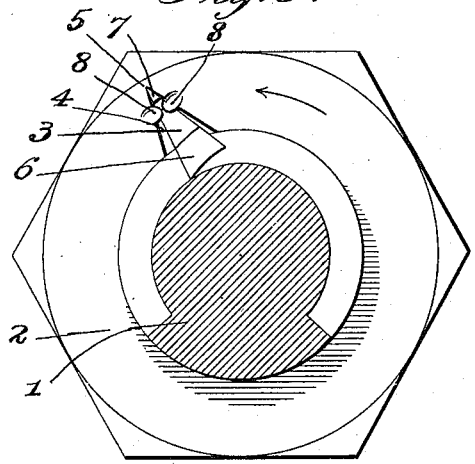
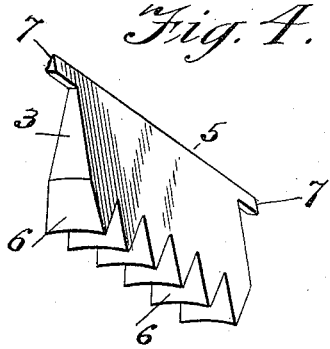
WITNESSES
INVENTOR
Isaac L. Miller
BY
Frank W. Ashley
ATTORNEYS

UNITED STATES PATENT OFFICE.

ISAAC L. MILLER, OF NEW YORK, N. Y.

NUT-LOCK.

975,709.

Specification of Letters Patent.  Patented Nov. 15, 1910.

Application filed April 17, 1909.  Serial No. 490,443.

*To all whom it may concern:*

Be it known that I, ISAAC L. MILLER, a citizen of the United States, and resident of New York, borough of Brooklyn, in the county of Kings and State of New York, have invented certain new and useful Improvements in Nut-Locks, of which the following is a specification.

This invention relates to improvements in nut locks.

Figure 1 is a side view of a bolt having secured thereon a nut provided with a lock constructed in accordance with the present invention. Fig. 2 is an end view of the bolt secured and a nut provided with a lock constructed in accordance with the present invention, showing the bolt in section, and the locking member in its unlocked position. Fig. 3 is a view similar to that shown in Fig. 2, showing the locking member in its locked position. Fig. 4 is an isometric perspective of the locking member.

Among the principal objects which this invention has in view is to provide a locking member for a screw nut which corresponds with the thread of the nut to receive the thread of the bolt in close engagement, the thread on the locking member conforming to the thread of the nut and bolt in curve and in pitch. And to provide means for retaining the locking member in position in the nut to which it is applied, when the bolt is not engaged.

With these objects in view, the bolt —1— is shown in the drawings as being in engagement with the screw nut —2—. The nut —2— is provided with the locking member —3—. The nut —2— is of the ordinary description except that it is provided with a recess —4— to receive and hold the locking member. The locking member —3— is wedge shaped in section and constructed to a dimension slightly more contracted than the recess —4— in the nut. The sharp edge —5— of the member —3— forms the rest for the same. It is seated in the contracted end of the recess —4—. It is upon this edge —5— that the locking member —3— rocks in operating. The flared end of the member —3— is provided with the supplemental thread grooves —6— —6—, which, as above stated, conform in pitch and curve with the threads of the nut —2— and bolt —1—. The member —3— is provided at the rocking or pivotal edge —5— with the extensions —7— —7—. The dimension of the locking member from the extremes of the extensions —7— —7—, equals the length of the nut —2—. The body portion of the member —3— is, therefore, of slightly less length than the length of the nut. When the member —3— is placed in position within the recess —4— in the nut —2—, the metal of the nut adjacent to the recess —4— is forced over the recess —4— to form the ears —8— —8—. The ears —8— —8— extend behind the extensions —7— —7—, to hold the member —3— in its position in the nut —2—. The ears —8— —8— do not impinge upon the extensions —7— —7— so as to interfere with the free rocking movement of the member —3—. The threaded segments —6— of the member —3— conform accurately to the threads of the nut when the member is in the unlocked position as shown in Fig. 2 of the drawings.

In its operation a nut and lock constructed as above described locks the nut firmly to the bolt as follows: The arrows shown in Figs. 2 and 3 indicate the movement of the nut. Thus in Fig. 2, the nut is rotated to the right as indicated by the arrow, and the locking member —3— is held against the wall of the recess —4— on the left of the same. In this position, the curve and pitch of the segments —6— conform accurately to the curve and pitch of the threads of the nut and bolt permitting unrestrained screwing action of the nut. When the nut has been seated in its forward position, it will be understood that there is a strain on the segments —6— —6— against the threads of the bolt. Any movement on the part of the nut in the unscrewing direction throws the locking member —3— into the position shown in Fig. 3. This action is induced in a large measure by the drag of the segments —6— on the thread of the bolt. The dimension along the sides of the member —3— from the rocking edge —5— to the edge of the segments —6—, is greater than the dimension through the center of the member —3— from the edge —5— to the center of the segments. Therefore, in assuming the position shown in Fig. 3, the larger dimension along the sides of the member —3— is presented to take the place of the smaller dimension through the center of the locking member. This results in a jam of the member —3— between the bolt on the one side and the outer contracted edge of the recess in the nut on the other side. Further, when assuming the position shown in Fig. 3, the threads of the segments —6— are thrown out of adjustment and bind along the side of the thread of the bolt, thereby aiding in the lock.

One of the principal advantages in this form of lock is that the locking member is in such relation to the bolt that the slightest movement on the part of the bolt or nut instantly causes the rocking of the member —3— to produce the lock.

Having thus described this invention, what is claimed is:

1. A nut lock comprising a member triangular in cross section, the one side of which is curved and grooved to the curve and pitch of the screw thread of the nut; a nut having a triangular recess extending through the full length of the nut; pins extended from said triangular member at the edge thereof removed from the bolt; extensions from the wall of the said recess in the nut, said extensions protruded into the path of said pins to prevent the withdrawal of the triangular member from the said recess.

2. A nut lock comprising a nut having a recess therein which extends the length thereof, and a locking member located in said recess and having a pin extending from each end thereof, and means formed integral with the nut and engaging said pins to hold the locking member in position.

3. A nut lock comprising a member triangular in cross section, the one side of which is curved and grooved to the curve and pitch of the screw thread of the nut and extending less than the depth of the thread of the nut when in its unlocked position on a bolt, a nut having a triangular recess extending through the full length of the nut, pins extended from said triangular member at each end thereof, and means connected to the nut and engaging said pins to prevent the withdrawal of the locking member from the recess in the nut.

4. A nut lock comprising a nut having a recess extending its length, a swinging locking member located in said recess and having a pin extending from each end thereof, and means connected to said nut and engaging said pins to prevent withdrawal of said locking member from said recess.

Signed at New York in the county of New York and State of New York this 16th day of April A. D. 1909.

ISAAC L. MILLER.

Witnesses:
  E. F. MURDOCK,
  MARGUERITE RUNALS.